United States Patent [19]
Sliwinski

[11] Patent Number: 6,167,531
[45] Date of Patent: Dec. 26, 2000

[54] METHODS AND APPARATUS FOR TRANSFERRING MIRRORED DISK SETS DURING SYSTEM FAIL-OVER

[75] Inventor: Wallace F. Sliwinski, Exton, Pa.

[73] Assignee: Unisys Corporation, Blue Bell, Pa.

[21] Appl. No.: 09/099,603

[22] Filed: Jun. 18, 1998

[51] Int. Cl.[7] ................................................ G06F 11/00
[52] U.S. Cl. ................................................ 714/13; 714/5
[58] Field of Search ................................ 714/5, 13, 15, 714/18, 20

[56] References Cited

U.S. PATENT DOCUMENTS

| | | | |
|---|---|---|---|
| 5,432,922 | 7/1995 | Polyzois et al. | 395/425 |
| 5,537,533 | 7/1996 | Staheli et al. | 395/182.03 |
| 5,546,558 | 8/1996 | Jacobson et al. | 395/441 |
| 5,592,611 | 1/1997 | Midgely et al. | 395/182.02 |
| 5,592,618 | 1/1997 | Micka | 714/54 |
| 5,604,862 | 2/1997 | Midgely et al. | 395/182.04 |
| 5,608,865 | 3/1997 | Midgely et al. | 395/180 |
| 5,611,069 | 3/1997 | Matoba | 395/441 |
| 5,664,187 | 9/1997 | Burkes et al. | 395/621 |
| 5,734,818 | 3/1998 | Kern | 714/20 |
| 5,781,716 | 7/1998 | Hemphill | 714/4 |
| 5,835,915 | 11/1998 | Carr | 707/2 |
| 5,933,653 | 8/1999 | Ofek | 710/6 |

FOREIGN PATENT DOCUMENTS

| | | |
|---|---|---|
| 0 721 162 A2 | 7/1996 | European Pat. Off. . |
| WO95/00906 | 1/1995 | WIPO . |

*Primary Examiner*—Robert W. Beausoliel, Jr.
*Assistant Examiner*—Bryce Bonzo
*Attorney, Agent, or Firm*—Rocco L. Adornato; Mark T. Starr

[57] ABSTRACT

A method for transferring sets of mirrored disks from an active system to a standby system in the event of a failure of the active system, wherein each of the computer systems maintains a table containing entries that reflect the state of sets of mirrored disks attached to that system, comprises merging the entries of the table of the failed system with the entries of the table of the standby system to create a merged mirror information table on the standby system. A connection to the mirrored sets of the failed system can then be switched to the standby system, and the mirrored sets then brought on-line on the standby system in accordance with information in the merged table.

12 Claims, 6 Drawing Sheets

FIG. 1

| MIT_SERIALNO | | |
|---|---|---|
| mit_optionf    0 = mit_option_discard    1 = mit_option_dms | | |
| mit_owl_lostf | | |
| mit_break_setf | | |
| mit_set_needs_replacement | | |
| mit_recreate_mask | | |
| mit_recreate_setf | | |
| mit_quickaudit_okf | | |
| mit_noaccessf | | |
| mit_serialnof | | |
| MIT_ID | | |
| MIT_SETINFO1 | | |
| NOT USED | | |
| MIT_LABEL_ID (0) | MIT_SETINFO2 (0) mirror_lu_nof mit_statef | MIT_SETINFO3 (0) |
| MIT_LABEL_ID (1) | MIT_SETINFO2 (1) mirror_lu_nof mit_statef | MIT_SETINFO3 (1) |
| MIT_LABEL_ID (2) | MIT_SETINFO2 (2) mirror_lu_nof mit_statef | MIT_SETINFO3 (2) |
| MIT_LABEL_ID (3) | MIT_SETINFO2 (3) mirror_lu_nof mit_statef | MIT_SETINFO3 (3) |

SYSTEM A MIT
AFTER MERGE

| MIT_SERIALNO |
|---|
| mit_optionf = 1 (DMS) |
| mit_owl_lostf |
| mit_noaccessf |
| mit_serialnof = 5 |
| MIT_ID = 2 |
| OLBH |
| ORPHAN |

40'

| MIT_SERIALNO |
|---|
| mit_optionf = 1 (DMS) |
| mit_owl_lostf |
| mit_noaccessf |
| mit_serialnof = 6 |
| MIT_ID = 6 |
| OLBH |
| OLBH |

42'

| MIT_SERIALNO |
|---|
| mit_optionf = 1 (DMS) |
| mit_serialnof = 5 |
| MIT_ID = 7 |
| ORPHAN |
| ORPHAN |

64

| MIT_SERIALNO |
|---|
| mit_optionf = 1 (DMS) |
| mit_noaccessf |
| mit_serialnof = 5 |
| MIT_ID = 8 |
| ORPHAN |

44'

| MIT_SERIALNO |
|---|
| mit_optionf = 1 (DMS) |
| mit_serialnof = 8 |
| MIT_ID = 3 |
| OL |
| OL |

66

| MIT_SERIALNO |
|---|
| mit_optionf = 0 (DSCD) |
| mit_owl_lostf |
| mit_break_setf |
| mit_noaccessf |
| mit_serialnof = 7 |
| MIT_ID = 12 |
| OLBH |
| OLBH |

48'

| MIT_SERIALNO |
|---|
| mit_optionf = 0 (DSCD) |
| mit_serialnof = 9 |
| MIT_ID = 9 |
| OLBH |
| OLBH |

METHODS AND APPARATUS FOR TRANSFERRING MIRRORED DISK SETS DURING SYSTEM FAIL-OVER

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to computer systems that support disk mirroring, and more particularly, to methods and apparatus for transferring a mirrored set from a failed system to a standby system during a fail-over operation.

2. Description of the Prior Art

Certain computer systems, such as, for example, Unisys enterprise servers that run the Unisys MCP operating system, including A Series and ClearPath NX computer systems, have for some time provided the ability to maintain from two to four disks as a mirrored set, that is, as exact copies of each other. Initial creation of a mirrored set involves copying all of the data from a source disk to a destination disk. Up to two additional copies can be added later in the same way. On the aforementioned Unisys systems, mirrored sets are created using a mirror create process that employs a series of read/write pairs of large blocks of data. The source data is read, then written to the destination disk. Creation and maintenance of the mirrored set is managed by the operating system (MCP). This differs from other computer vendors who place responsibility for creating and maintaining mirrored sets in the disk controller. The Unisys approach, in which disk mirroring is managed by the operating system, is advantageous because failure of a controller will not necessarily cause a loss of the mirrored disk set.

In order to maintain its mirrored disk sets, the Unisys MCP operating system uses three main structures: a portion of the physical pack label area, a mirror information table (MIT) and an outstanding write list (OWL). The mirror information portion of the physical pack label contains a relative set member, member timestamp and member status, along with a four-bit mask of current set members; it is the only part of a mirrored pack not kept identical across all ONLINE members. Unless a mirrored pack indicates "closed" status in its label, there must be an entry for that mirrored pack in the MIT for the pack to be brought online as a mirrored unit. (Closing an in-use mirrored set updates the labels of all current members to indicate this status and removes the set's entry from the MIT; only when closed can a mirrored set be ported from one system to another intact.) The MIT contains status information about all in-use mirrored sets of a system, and is stored on a special system disk called the halt/load unit. The OWL is maintained in non-volatile system memory, and is a record of all write operations to mirrored sets that have been begun but not yet completed. The OWL contains validation timestamps indicating the MIT to which it corresponds—they differ, old and new, only when the MIT is being updated. In the event of a system interruption, the ONLINE members of all mirrored sets will be preserved provided the MIT and OWL previously in-use are still intact. A fourth mirroring structure, the audit table, is a record of all out-of-data areas of temporarily OFFLINE mirrored set members. Returning an OFFLINE member to ONLINE status involves audit application, updating its out-of-date areas to current from other ONLINE members. Because the audit table is kept in volatile system memory, it is not maintained across system interruptions, so OFFLINE members of mirrored sets are lost across system interruptions.

Figure 1:
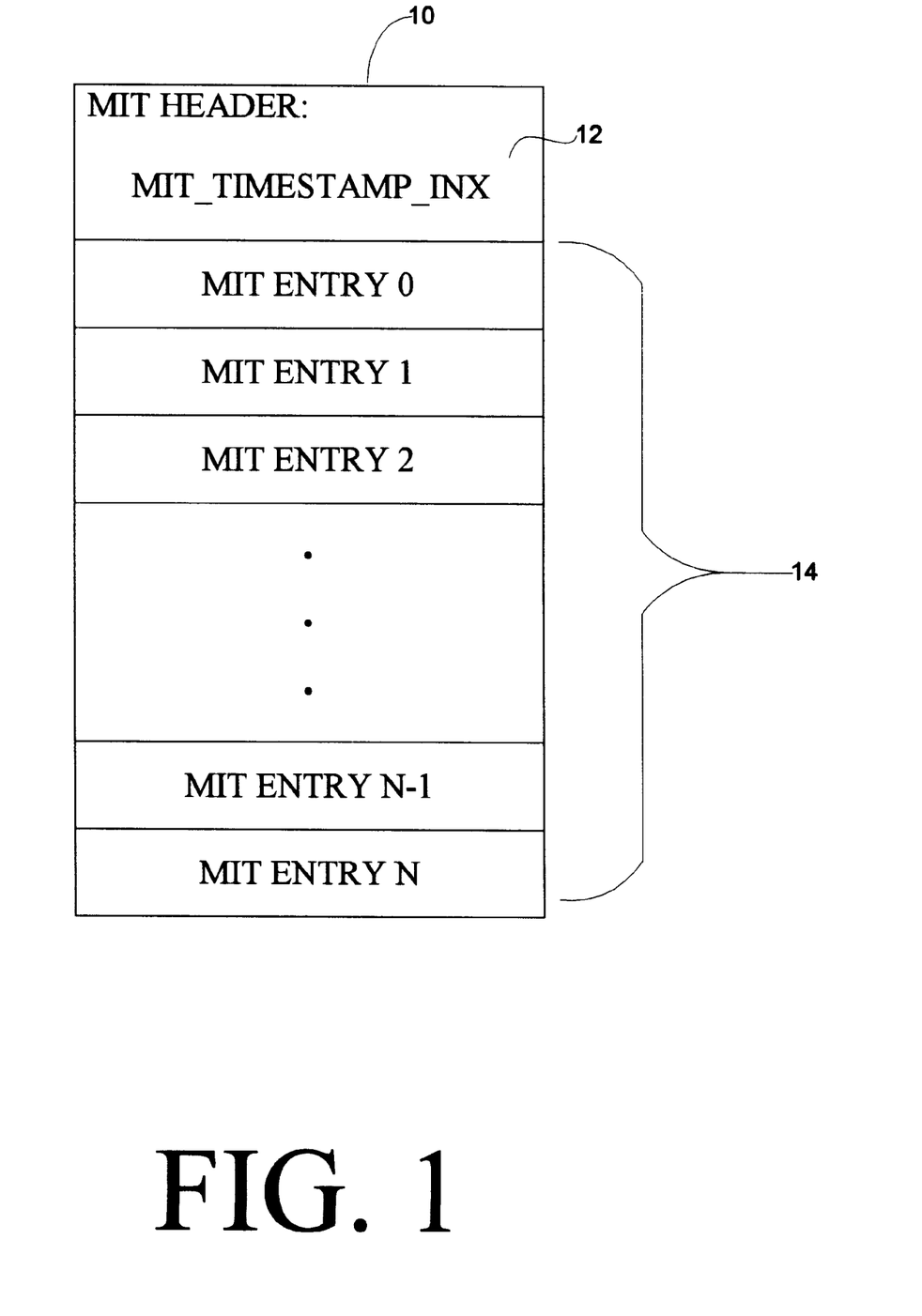
FIG. 1 illustrates the contents of a mirror information table.

FIG. 1 illustrates the overall contents of a mirror information table 10. The table includes a header portion 12, followed by an entry 14 for each mirrored set on the system. As shown, the header 12 holds the OWL synchronization timestamp (MIT_TIMESTAMP_INX), as well as other information (not shown). In the present embodiment, the entries 14 that follow the header 12 are each 16-words in length.

Figure 2:
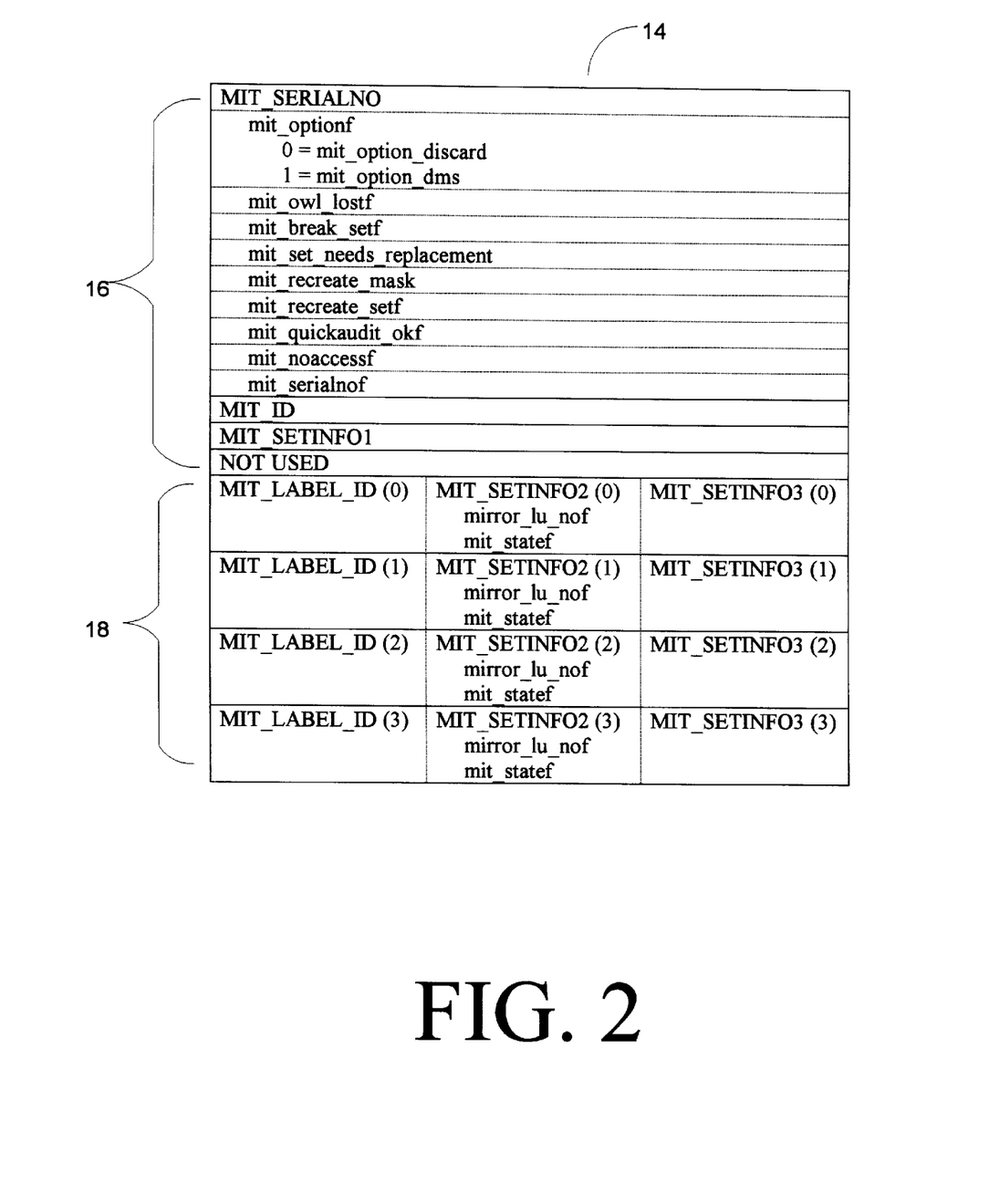
FIG. 2 illustrates the contents of one entry of the mirror information table of FIG. 1, in accordance with a preferred embodiment of the present invention.

FIG. 2 shows the overall structure of one MIT entry 14. The first four words 16 of the entry contain information about the mirrored set as a whole. The MIT_SERIALNO word contains critical state and option information, including the set serial number (mit_serialnof), the OWL loss recovery (mit_optionf) and transient error recovery (mit_quickaudit_okf) strategies to be used for the set, and information used to support the Mirror Disk Pooling Facility (MDPF), if this optional feature is licensed to a site. (MDPF allows automated restoration of mirrored set members lost in most circumstances, minimizing the operator intervention required.) The MIT_ID word holds the current set timestamp (MIRROR_ID of set). The MIT_SETINFO1 word holds transient MCP status information not currently preserved across system interruptions. The fourth word is currently unused, having previously held in-core only information.

Referring to the MIT_SERIALNO word of the entry 14, the two OWL loss recovery options allowed are DISCARD (mit_optionf=0), which means that the MCP operating system is responsible for data resynchronization, and DMS (mit_optionf=1), which means that application programs are responsible for data resynchronization. The DMS option is named for the Unisys Data Management System that normally performs this task. The mit_owl_lostf ("the OWL has been lost") and mit_break_setf ("set is to be broken") flags are status flags indicating how a set must be handled when it reappears after an interruption. Once set, these flags remain set until this handling has been completed. Note that an "OWL has been lost" condition always necessitates breaking of in-use mirrored sets with a recovery option of DISCARD, because the MCP does not have the critical OWL structure information required to resynchronize set members. Either the mit_recreate_setf flag ("MDPF recreate set") or the mit_break_setf flag is always set along with mit_owl_lostf flag for sets with a recovery option of DISCARD across an interruption. When individual set members (rather than the entire set) are lost and MDPF recreation is possible, a running count of lost members needing replacement is kept in the mit_set_needs_replacementf field. The four-bit mit_recreate_maskf field indicates which member(s) to recreate. The mit_noaccessf flag ("set never accessed") is a new flag that has been added in accordance with an aspect of the present invention. This field is described hereinafter in greater detail.

Still referring to FIG. 2, the remaining twelve words of a MIT entry (shown at 18) consists of three words for each of the four (4) possible set members. A member is valid if its member timestamp word (MIT_LABEL_ID) is non-zero. When the labels of one or more mirrored set members are being updated, the new timestamp is first stored into the MIRROR_ID of the set and the MIT preserved to disk. Then, as individual members' labels are updated, new MIT_LABEL_ID timestamps are stored into the in-core MIT. Finally, when all label updates have been completed, the MIT is again written to disk. This ensures that a valid set member label must always match either its MIT_LABEL_ID or the MIRROR_ID of its set (or both, if they are identical). The MIT_SETINFO2 word of a member entry has MCP physical pack information, along with two critical fields: the current member status (mit_statef) and its logical unit association (mirror_lu_nof). A non-zero value in mirror_lu_nof means that a member is currently "known" by the MCP to be associated with a particular physical unit. A value of zero means that the current MCP incarnation has not logically seen this member yet. The mit_statef of a member indicates its current logical status, typically ONLINE if currently in use, OFFLINE if an audit trail is being kept for the member, APPLYING AUDIT if a member is either being created or being restored to ONLINE status (mirror creation can be considered application of an audit trail specifying that the entire pack is out of date), possibly ORPHAN if the member is known to be out-of-date but its physical label on disk has not yet been invalidated.

After a system interruption, MCP initialization pre-processes the MIT before dealing with any mirrored sets. All members with ONLINE status are changed to ONLINE_BEFORE_HALT_LOAD (OLBH) status pending their reappearance. Halt/Load is a Unisys term that refers to the process by which a system running the MCP operating system is started—analogous to the boot process in a desktop computer. Members in the OFFLINE, GOING OFFLINE and APPLYING AUDIT states are either set OFFLINE and marked for possible recreation (setting mit_recreate_setf along with the proper bit in the mit_recreate_mask field) or immediately converted to ORPHAN status. ORPHAN members, or those in the transient SET BEING OPENED/CLOSED states are unaffected. All logical unit associations are invalidated.

Recently, customers have begun to request redundant systems to maintain high availability of their computing facilities. Essentially, these high availability configurations consist of two separate, but connected, computer systems (e.g., two A Series computers or two ClearPath HMP computer systems) of similar capability. One of the two systems functions as a "hot" standby, while the other serves as the active, or currently operational system. In the event of a failure of the active system, customer operations "fail-over" to the standby system. In these configurations, the peripherals needed for active system operation, including all those disk packs comprising the customer "pack data farm", are connected to both systems. For maximum physical security of data, these connections may be by means of something akin to an A/B switch. Initially, peripheral access is only via the active system, but in the event of a fail-over, the switches can be flipped so that the peripherals are then connected to the standby system.

Figure 3:
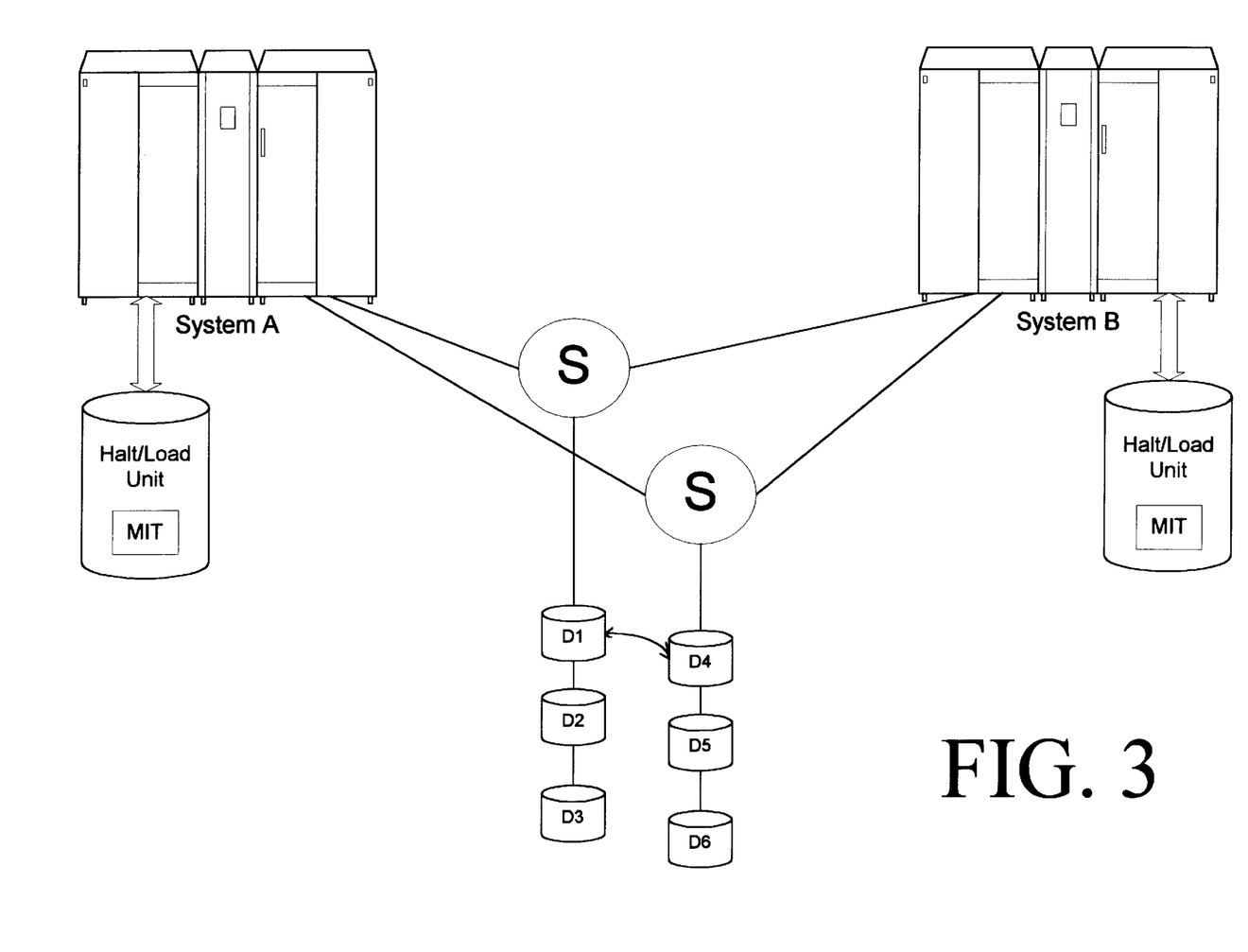
FIG. 3 is a block diagram illustrating a redundant computer system having a first system (A) and a second system (B), in which the methods and apparatus of the present invention may be employed.

FIG. 3 is a block diagram illustrating an exemplary redundant configuration comprising two systems, A and B. In this example, assume that system B is presently the active system and that system A is the standby. Each system operates under its own control of the Unisys MCP operating system, and each system has its own MIT. The MIT for each system is stored in the Halt/Load Unit for that system which, as mentioned above, is a special system disk. The systems are connected through respective switches ("S") to two busses of disk units (D1, D2, D3 and D4, D5, D6, respectively). In this example, the busses to which the respective disk units are attached are SCSI busses, and the switches S are SCSI A/B switches. As illustrated by the arrow between disk units D1 and D4, these two disk units can comprise a mirrored set. That is, D1 will be a mirror of D4. Other mirrored sets can exist and may contain more than one disk unit.

In this example, since system B is the active system, the SCSI switches are set to connect the respective disks to that system's I/O subsystem. In the event of a failure on system B, the SCSI switches can be switched-over to connect the respective disks to the standby system A. That system can then take-over computing responsibilities.

A problem that arises with these redundant systems is how to accomplish "fail-over" of a customer's pack data farm when some or all of this data is on MCP-mirrored disks. Since almost none of the mirrored sets involved will have "closed" status at the time of an unforeseen failure, while they can be physically switched to the standby system, the packs cannot be brought online for use without breaking the mirrored sets. Thus, the standby system incurs the overhead of having to recreate all its mirrored sets for maximum data safety. And it may have to do so absent knowledge that one physical unit is the "wrong" choice as the source copy, because of peripheral problems that were occurring at the time of the fail-over. Moreover, until recreation of a given set is complete, failure of the source pack unit can completely disrupt site operations, ruining the maximized availability for which the redundant configuration was intended. Thus, there is a need for methods and apparatus for migrating (i.e., transferring) in-use mirrored sets from one system to another, at least for sets with a recovery option of DMS (mit_optionf=1). The present invention satisfies this need.

SUMMARY OF THE INVENTION

The present invention is directed to methods and apparatus for use in redundant systems for transferring a mirrored disk set from an active system that has failed to a standby system during a fail-over operation. The methods and apparatus of the present invention are particularly useful in redundant configurations that employ computer systems in which information concerning the state of sets of mirrored disks attached to the system is maintained in a table by the operating system. The present invention addresses the problem that results when a mirrored set on the active system is in-use at the time of a system failure, and the user wishes to switch that mirrored set over to the standby system without having to break the mirrored set.

According to the present invention, in the event of a failure of the active system in a redundant configuration, the entries in the table of the failed system (i.e., the table in which information concerning the status of in-use mirrored sets attached to that system is maintained) are merged into the corresponding table of the standby system, before the mirrored sets are switched-over and brought online on the standby system. The step of merging the mirror information table of the failed system with the mirror information table of the standby system ensures, in most cases, that the in-use mirrored sets of the failed system can be successfully transferred and brought online on the standby system, provided that the applications using them are responsible for resynchronizing data contents of all current set members after an interruption.

In accordance with a preferred embodiment of the present invention, merging of entries from the mirror information table (MIT) of the failed system into the in-use MIT of the standby system is performed according to the following rules:

1. Any entry in the MIT of the failed system that indicates that its set was "never accessed" is ignored;

2. Any "real" entry in the MIT of the failed system (a "real" entry being one in which at least some members of the set are not orphan nor invalid) is added to the MIT of the standby system, if there is no "real" entry already in the standby system MIT having the same serial number;

3. If there is a "real" entry in the standby system MIT that has a serial number that matches the serial number of a "real" entry from the failed system MIT, then overwrite the standby MIT entry with the entry from the failed system MIT, if the standby MIT entry does not correspond to any mirrored set currently in-use by the standby system; and 4. For an "orphan" entry of the failed system MIT, add the entry to the standby system MIT unless an entry with the same serial number and set timestamp is found. If such an entry is found in the standby system MIT, then overwrite it with the entry from the failed system MIT.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The methods and apparatus of the present invention are intended for use in systems, such as Unisys enterprise servers that run under the control of the Unisys MCP operating system, in which information concerning the state of sets of mirrored disks attached to the system is maintained in a table by the operating system. Specifically, the present invention is directed to methods and apparatus for use in redundant systems of this type for transferring a mirrored set from an active system that has failed to a standby system during a fail-over operation. The present invention addresses the problem that results when a mirrored set on the active system is in-use at the time of a system failure, and the user wishes to switch that mirrored set over to the standby system without having to break the mirrored set.

The methods and apparatus of the present invention may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general purpose processor, the program code combines with the processor to provide a unique apparatus that operates analogously to specific logic circuits.

For purposes of illustrating the present invention, the invention is described as embodied in a redundant configuration comprising two Unisys enterprise servers running under the control of the Unisys MCP operating system. As described above, in such systems, the MCP operating system maintains a table containing entries that reflect the state of one or more sets of mirrored disks attached to the system. This table is referred to a mirror information table. While the present invention is described in this particular context, it is understood that the present invention is by no means limited to use in such Unisys system. Rather, the present invention may be employed in any redundant configuration of computer systems wherein each computer system of the redundant configuration operates under the control of an operating system that maintains a table containing entries that reflect the state of one or more sets of mirrored disks attached to that system.

According to the present invention, in the event of a failure of the active system in a redundant configuration, the entries in the mirror information table (hereinafter "MIT") of the failed system (i.e., the table in which information concerning the status of mirrored sets attached to that system is maintained) are merged into the MIT of the standby system, before the mirrored sets are switched-over and brought online on the standby system. The step of merging the MIT of the failed system with the MIT of the standby system ensures, in most cases, that the in-use mirrored sets of the failed system can be successfully transferred and brought online on the standby system.

In a preferred embodiment, a first step of this merging process involves pre-processing the MIT of the failed system into a local copy as though the MCP of the failed system were reinitializing after an interruption across which the OWL of the failed system was lost. In essence, a simulated Halt/Load operation is performed across which MDPF mirrored set reconstruction is considered inapplicable.

The standby system then takes each mirrored set entry from the locally-processed MIT copy of the failed system, one at a time. Each entry is checked for a match (via serial number and/or set timestamp) against the entries in the in-use MIT of the standby system. These comparisons assume one crucial restriction has been followed by the user: all mirrored sets of the two systems must have unique serial numbers. Except for MIT entries containing only information about ORPHAN members (left over from incomplete breaking of old mirrored sets, as least as regards invalidating physical pack labels), if entries from different MITs have the same serial number, they are assumed to refer to the same physical mirrored set.

For purposes of further discussion, a MIT entry is defined as "real" if it contains non-ORPHAN member information (i.e., that status of at least some members of the mirrored set is not ORPHAN and not INVALID), and is defined as "orphan" if it contains only ORPHAN and INVALID members. Assuming that the restriction noted above has been followed, merging of entries from the locally-processed MIT of the failed system into the in-use MIT of the standby system is performed according to the following rules:

1. Any entry in the MIT of the failed system that has the "never accessed" (mit_noaccessf) flag set is ignored. Whenever the merging process adds or overwrites a MIT entry, the "never accessed" flag is set in the entry copied over. The MCP explicitly resets this bit in a MIT entry when it associates a member of the mirrored set with a particular physical unit, that is, as soon as any pack of the mirrored set is seen on the system. Finding a MIT entry with the mit_noaccessf flag set means that the entry was copied over as part of a previous merge process, but the physical mirrored set never appeared. Because the physical transfer of that mirrored set apparently did not happen successfully, the entry should never be merged back into the MIT from which it came, since it inherently represents less current information about a mirrored set always attached to one particular system.

2. If there is no "real" entry in the standby system MIT corresponding to the serial number of a "real" entry from the failed system MIT, the entry is added to the standby system MIT.

3. If there is a "real" entry in the standby system MIT corresponding to the serial number of a "real" entry from the failed system MIT, check whether the standby MIT entry has any logical unit associations. Provided there are no such associations, that is, the standby entry does not correspond to a mirrored set currently being accessed by that system, overwrite the standby MIT entry with the entry from the failed system MIT.

4. For an "orphan" entry of the failed system MIT, add the entry to the standby system MIT unless an entry with the same serial number and set timestamp is found. If such an entry is found in the standby system MIT, overwrite it with the entry from the failed system MIT.

Once the merging of MIT entries is completed in accordance with the foregoing rules, the disks of the mirrored sets can be brought on-line by the standby system. The merging of MIT entries ensures that any valid mirrored sets that existed at the time of the system failure, even those being accessed at the time, are maintained when brought over to the standby system, provided their recovery option is DMS (mit_optionf=1).

Figure 4:
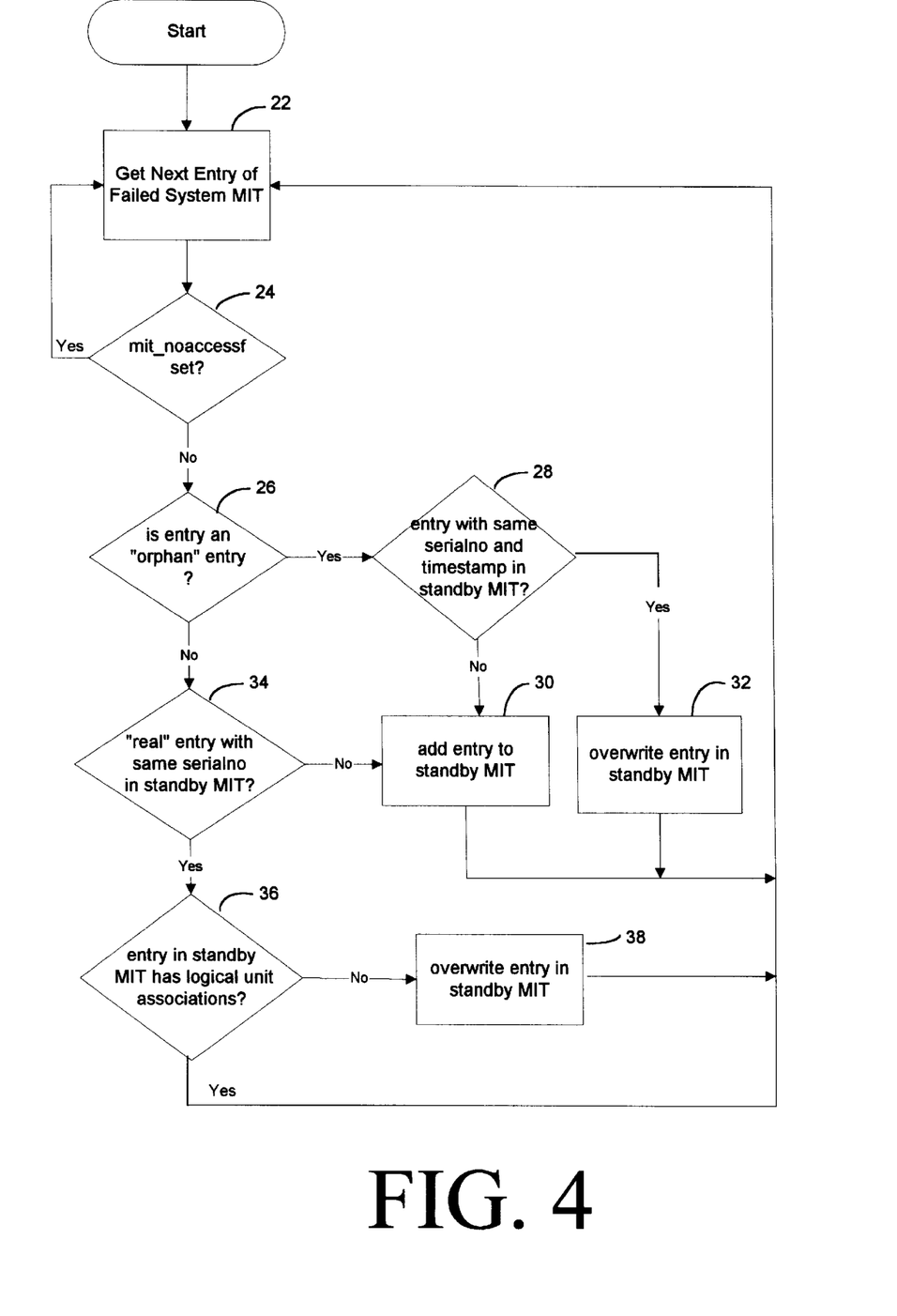
FIG. 4 is a flow diagram illustrating a preferred embodiment of a method of the present invention.

FIG. 4 is a flow diagram illustrating one embodiment of a method of the present invention that implements the foregoing rules. The steps shown in this flow diagram follow the pre-processing of the failed system MIT. The process begins at step 22, where an entry of the failed system MIT is retrieved. At step 24, the entry is examined to determine if the mit_noaccessf flag is set. If so, this entry is ignored, and control returns to step 22 where a next entry is retrieved for processing. If the mit_noaccessf flag is not set, then control passes to step 26.

At step 26, the state of the members of the set that the entry represents is examined to determine if this is an "orphan" entry (as defined above). If the entry is an "orphan" entry, then control passes to step 28. At step 28, if an entry is found in the standby system MIT that has the same serial number (mit_serialnof) and set timestamp (MIT_ID) as the "orphan" entry of the failed system MIT, then the matching entry (i.e., same serial number and set timestamp) in the standby system MIT is overwritten with the "orphan" entry of the failed system MIT at step 32. If, instead, it is determined in step 28 that no matching entry is found in the standby system MIT, then the "orphan" entry of the failed system MIT is simply added to the standby system MIT at step 30. Control then passes back to step 22 where the next entry of the failed system MIT is processed.

If in step 26, it is determined that the entry is not an "orphan" entry, but instead is a "real" entry (as defined above), then control passes to step 34. At step 34, it is determined whether a "real" entry having the same serial number exists in the standby system MIT. If not, then the "real" entry of the failed system MIT is added to the standby system MIT. If there is a match (i.e., same serial number), then control passes to step 36 to determine whether the members of the set represented by the matching entry in the standby system MIT have any logical unit associations (i.e., whether the matching entry corresponds to a mirrored set currently being accessed by that system). If there are no logical unit associations, then it is safe to overwrite the entry with the entry of the failed system MIT, as shown at step 38. If logical unit associations are present (i.e., mit_lu_nof≠0), then the entry of the standby system is not overwritten. This is an apparent violation of the restriction regarding more than one "real" mirrored set with a given serial number-the set cannot be migrated unless the conflicting entry is removed from the MIT by formally "closing" the set currently being accessed on the standby system. Control then passes back to step 22 for retrieval of the next entry of the failed system MIT.

The foregoing rules and method may be implemented in the form of an apparatus for carrying out the method, including means for performing the various steps of the method. Such an apparatus may, for example, comprise a programmed computer. The foregoing rules and method may also be implemented in the form of program code stored on computer-readable medium or transmitted over some transmission medium.

FIGS. 5A–D illustrate an example of the operation of the method of the present invention. Using the redundant configuration of FIG. 3 as an example, assume that system B is the active system and that system A is the standby system. Next assume that a failure occurs on system B, requiring a fail-over to system A.

Figure 5A:
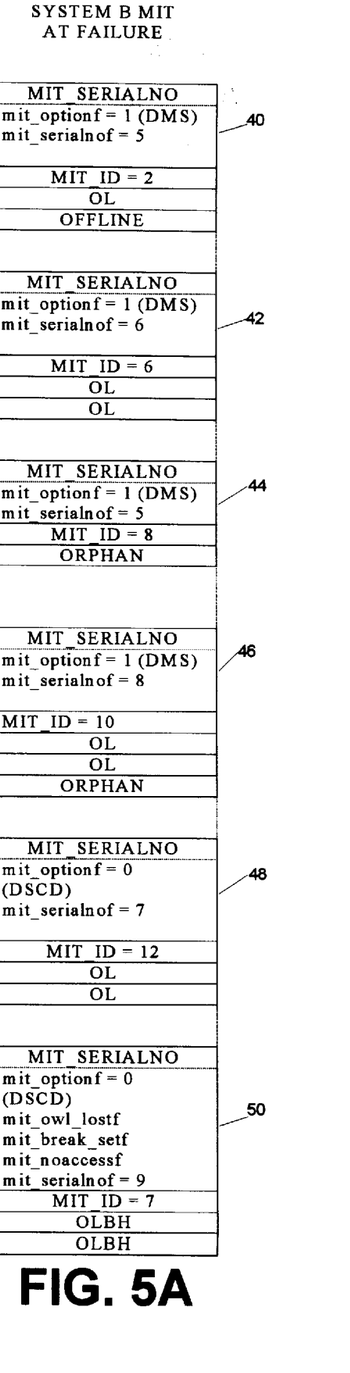
FIG. 5A is a diagram illustrating exemplary entries of the mirror information table of an active system (e.g., system B of FIG. 3) of a redundant configuration at the time of failure of that system.

FIG. 5A illustrates an exemplary MIT of system B at the time of failure. In this example, the MIT of system B has six entries 40, 42 . . . 50. Each entry has a set serial number (mit_serialnof) and set timestamp (MIT_ID). The values assigned to these fields are for purposes of illustration only and do not reflect the format or range of values that would be employed in use in an actual system. Note also that in these examples, not all of the information in a given MIT entry is shown; rather, only the information necessary to illustrate the operation of the invention has been provided. Specifically, only the mit_optionf and mit_serialnof fields of the MIT_SERIALNO word, the MIT_ID word, and the mit statef field for the set members of each entry are shown.

Figure 5B:
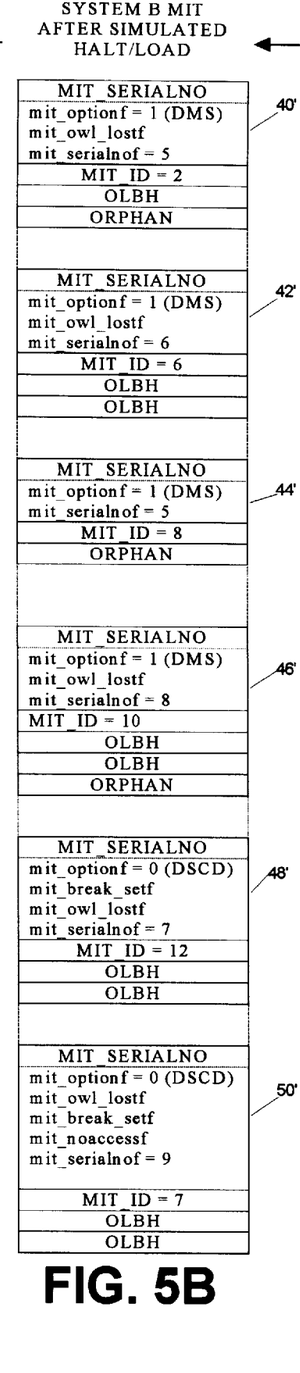
FIG. 5B is a diagram illustrating the contents of the mirror information table of FIG. 5A after simulated halt/load has been performed, in accordance with one aspect of the present invention.

FIG. 5B illustrates the contents of each entry of the failed system MIT (system B) after the simulated Halt/Load has been performed. As a result, any set members with a status of ONLINE are changed to ONLINE_BEFORE_HALT_LOAD (OLBH). Also, the OFFLINE status of the set member in entry 40 changes to ORPHAN.

Figure 5C:
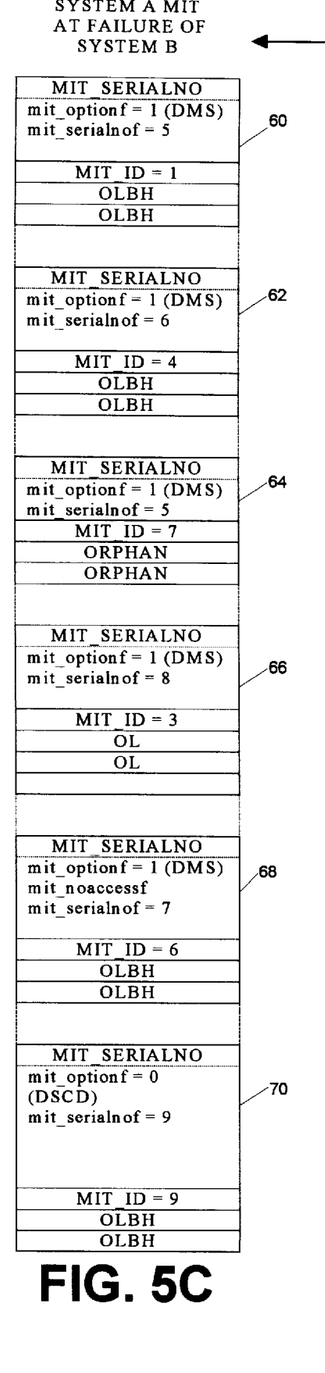
FIG. 5C is a diagram illustrating exemplary entries of the mirror information table of a standby system (e.g., system A of FIG. 3) of the redundant configuration at the time of failure of the active system.

FIG. 5C illustrates an exemplary MIT of the standby system, system A, at the time of system B failure. As shown, there are also six entries 60, 62 . . . 70 in this exemplary MIT.

Figure 5D:
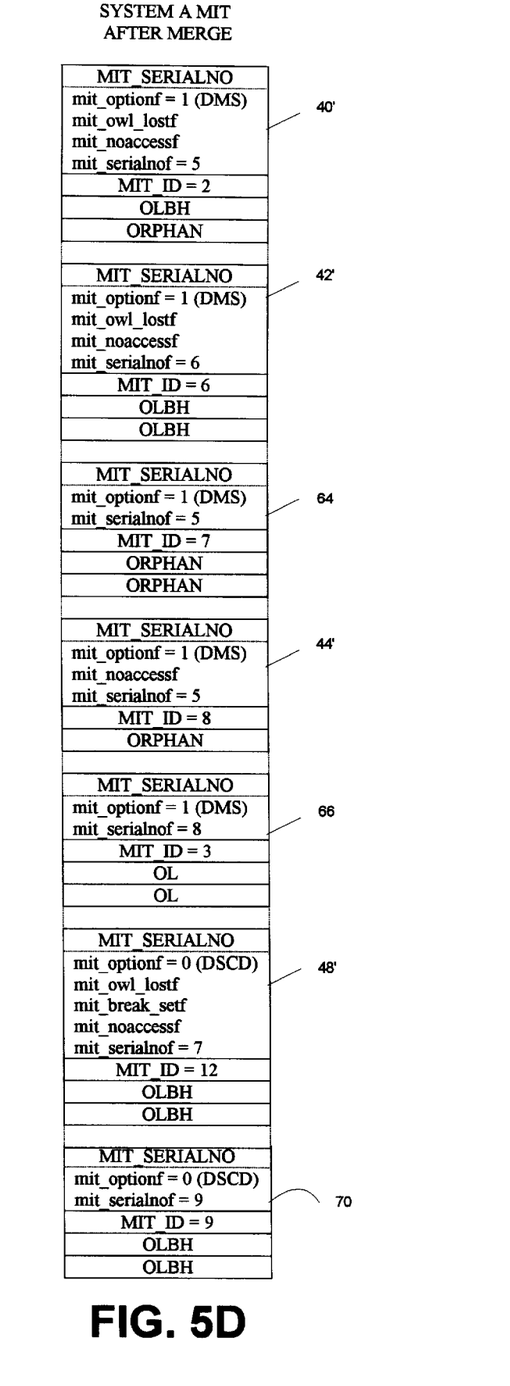
FIG. 5D is a diagram illustrating exemplary results of merging the MIT of FIG. 5B with the MIT of FIG. 5C in accordance with the methods and apparatus of the present invention.

FIG. 5D illustrates the MIT that will result from the merging of the standby system MIT of FIG. 5C and the pre-processed MIT of the failed system (FIG. 5B), in accordance with the method of the present invention. The entries 40', 42' . . . 50' of the pre-processed MIT of the failed system are processed, in turn, as follows:

Entry 40' is a "real" entry, because it has at least one non-orphan member. The serial number (mit_serialnof) of this entry matches the serial number of entry 60 of the standby system MIT. According to the rules described above, and because entry 60 does not represent a set that is currently being accessed on the standby system (i.e., the members do not have any logical unit associations), entry 60 is overwritten with entry 40', as shown in FIG. 5D.

Entry 42' is also a "real" entry. Its serial number matches that of entry 62 of the standby system MIT. Accordingly, entry 62 is likewise overwritten with entry 42', since the members of the set represented by entry 62 do not have any logical unit associations.

Entry 44' is an "orphan" entry, because the set that it represents has only a single member with a status of ORPHAN. Entry 64 of the standby system MIT has the same serial number as entry 44', but it does not have the same timestamp (MIT_ID). Consequently, entry 64 is not overwritten. Rather, entry 44' is simply added to the MIT of the standby system, as shown in FIG. 5D.

Entry 46' is another "real" entry, whose serial number matches that of entry 66 in the standby system MIT. But the set that entry 66 represents already has ONLINE members on system A. This is an instance of the error case noted in connection with step 36 of the flow diagram of FIG. 4.

Entry 48' appears to be an instance of a mirrored set that is always on system B and whose recovery option was changed from DMS to DISCARD after the last pack farm migration from system B to system A. Because the OWL has been lost, the set is now marked "to be broken" should it ever physically appear on system A.

Entry 50' has the mit_noaccessf flag set. Consequently, even though its serial number matches the serial number of entry 70 of the standby system MIT, entry 50' will be ignored and entry 70 will remain in the merged MIT, as shown in FIG. 5D. This corresponds to an instance of a mirrored set that is always physically on system A.

As the foregoing illustrates, the methods and apparatus of the present invention are intended for use in systems, such as Unisys enterprise servers that run under the control of the Unisys MCP operating system, in which information concerning the state of sets of mirrored disks attached to the system is maintained in a table by the operating system. More specifically, the present invention is directed to methods and apparatus for use in redundant systems of this type for transferring a mirrored set from an active system that has failed to a standby system during a fail-over operation. It is understood that changes may be made to the embodiments described above without departing from the broad inventive concepts thereof. For example, while the invention is described as embodied in a redundant configuration comprising two Unisys enterprise servers running under the control of the Unisys MCP operating system, the present invention may be employed in any redundant configuration of computer systems wherein each computer system of the redundant configuration operates under the control of an operating system that maintains a table containing entries that reflect the state of one or more sets of mirrored disks attached to that system. Accordingly, the present invention is not limited to the particular embodiments disclosed, but is intended to cover all modifications that are within the spirit and scope of the invention as defined by the appended claims.

What is claimed is:

1. In a system comprising a first computer system and a second computer system, one of said first and second computer systems operating as an active system and the other operating as a standby system, an operating system on each of the first and second computer systems maintaining a table containing entries that reflect the state of one or more sets of mirrored disks attached to the system, each set of mirrored disks containing a plurality of members, a method for transferring sets of mirrored disks of the active system to the standby system in the event of a failure of the active system comprising the steps of:

merging the entries of the table of the failed system with the entries of the table of the standby system to create a merged mirror information table on the standby system;

switching a connection to the mirrored sets of the active system from the active system to the standby system; and bringing the mirrored sets on-line on the standby system based on information in the merged mirror information table.

2. The method recited in claim 1, wherein entries in the table of the failed system that are indicated as having never been accessed by the failed system are ignored in said merging step.

3. The method recited in claim 2, wherein for entries in the table of the failed system that represent a set of mirrored disks in which at least ones of the members of the set are not indicated as being orphaned or invalid, said merging step comprises:

comparing a serial number of each such entry of the table of the failed system with serial numbers of the entries of the table of the standby system;

for an entry of the table of the failed system for which no matching serial number is found in any of the entries of the table of the standby system, adding that entry of the table of the failed system to the table of the standby system;

for an entry of the table of the failed system for which a matching serial number is found in an entry of the table of the standby system, overwriting the matching entry in the table of the standby system with the entry of the table of the failed system, but only if the matching entry in the table of the standby system does not already represent a mirrored set that is currently being accessed on the standby system.

4. The method recited in claim 3, wherein for entries in the table of the failed system that represent a mirrored set in which the members of the set are indicated in the entry as being in one of an orphaned state and an invalid state, said merging step further comprises:

comparing a serial number and a timestamp of each such entry of the table of the failed system with the serial numbers and timestamps of the entries of the table of the standby system;

for an entry of the table of the failed system for which no matching serial number and timestamp are found in any entries of the table of the standby system, adding that entry of the table of the failed system to the table of the standby system;

for an entry of the table of the failed system for which an entry with a matching serial number and timestamp is found in the table of the standby system, overwriting the matching entry in the table of the standby system with that entry of the table of the failed system.

5. A system comprising:

a first computer system and a second computer system, one of said first and second computer systems operating as an active system and the other operating as a standby system, an operating system on each of the first and second computer systems maintaining a table containing entries that reflect the state of one or more sets of mirrored disks attached to the system, each set of mirrored disks containing a plurality of members;

means for merging the entries of the table of the failed system with the entries of the table of the standby system to create a merged mirror information table on the standby system in the event of a failure of the active system; and means for switching a connection to the mirrored sets of one of said first and second computer systems from that system to the other one of said systems.

6. The system recited in claim 5, wherein said means for merging further comprises means for ignoring any entries in the table of the failed system that are indicated as having never been accessed by the failed system.

7. The system recited in claim 6, wherein said means for merging further comprises, for entries in the table of the failed system that represent a set of mirrored disks in which at least ones of the members of the set are not indicated as being orphaned or invalid:

means for comparing a serial number of each such entry of the table of the failed system with serial numbers of the entries of the table of the standby system;

means for adding an entry of the table of the failed system to the table of the standby system if no matching serial number is found in any of the entries of the table of the standby system; and means for overwriting an entry in the table of the standby system with an entry of the table of the failed system if a serial number of the entry of the failed system matches a serial number of the entry of the standby system, but only if the matching entry in the table of the standby system does not already represent a mirrored set that is currently being accessed on the standby system.

8. The system recited in claim 7, wherein said means for merging further comprises, for entries in the table of the failed system that represent a mirrored set in which the members of the set are indicated in the entry as being in one of an orphaned state and an invalid state:

means for comparing a serial number and a timestamp of each such entry of the table of the failed system with the serial numbers and timestamps of the entries of the table of the standby system;

means for adding an entry of the table of the failed system to the table of the standby system if no matching serial number and timestamp is found in any of the entries of the table of the standby system; and means for overwriting an entry in the table of the standby system with an entry of the table of the failed system if a serial number and timestamp of the entry of the failed system matches a serial number and timestamp of the entry of the standby system.

9. A computer-readable medium bearing program code for use in a system comprising a first computer system and a second computer system, wherein one of said first and second computer systems operates as an active system and the other operates as a standby system, and wherein an operating system on each of the first and second computer systems maintains a table containing entries that reflect the state of one or more sets of mirrored disks attached to the system, each set of mirrored disks containing a plurality of members, the program code, when executed by one of the first and second computer systems, causing the computer system to merge the entries of the table of the failed system with the entries of the table of the standby system to create a merged mirror information table on the standby system, whereupon a connection to the mirrored sets of the active system can be switched from the active system to the standby system and the merged mirror information table can be used to bring the sets on-line in the standby system.

10. The computer-readable medium recited in claim 9, wherein the program code further causes said computer system to ignore entries in the table of the failed system that are indicated as having never been accessed by the failed system.

11. The computer readable medium recited in claim 10, wherein for entries in the table of the failed system that represent a set of mirrored disks in which at least ones of the members of the set are not indicated as being orphaned or invalid, the program code causes said computer system to:

compare a serial number of each such entry of the table of the failed system with serial numbers of the entries of the table of the standby system;

add an entry of the table of the failed system to the table of the standby system if no matching serial number is found in any of the entries of the table of the standby system; and overwrite an entry of the table of the standby system with an entry of the table of the failed system if a matching serial number is found in that entry of the table of the standby system, but only if the matching entry in the table of the standby system does not already represent a mirrored set that is currently in use on the standby system.

12. The computer-readable medium recited in claim 11, wherein for entries in the table of the failed system that represent a mirrored set in which the members of the set are indicated in the entry as being in one of an orphaned state and an invalid state, the program code further causes said computer system to:

compare a serial number and a timestamp of each such entry of the table of the failed system with serial numbers and timestamps of the entries of the table of the standby system;

add an entry of the table of the failed system to the table of the standby system if no matching serial number and timestamp is found in any of the entries of the table of the standby system; and overwrite an entry in the table of the standby system with an entry of the table of the failed system if a serial number and timestamp of the entry of the failed system matches a serial number and timestamp of that entry of the standby system.

* * * * *